United States Patent [19]

Asano et al.

[11] Patent Number: 4,768,217
[45] Date of Patent: Aug. 30, 1988

[54] PUBLIC TELEPHONE SET

[75] Inventors: Hiroyuki Asano; Yoshiaki Takeda; Osamu Kai, all of Tokyo, Japan

[73] Assignee: Tamura Electric Works, Ltd., Tokyo, Japan

[21] Appl. No.: 58,345

[22] Filed: Jun. 5, 1987

[30] Foreign Application Priority Data

Jun. 16, 1986 [JP] Japan ................... 61-138240

[51] Int. Cl.⁴ ............................... H04M 1/24
[52] U.S. Cl. ........................... 379/32; 379/33
[58] Field of Search .............. 379/27, 29, 1, 32, 33

[56] References Cited

U.S. PATENT DOCUMENTS 4,039,768  8/1977  O'Maley ................. 379/33
4,644,109  2/1987  Takeda .................. 379/27

FOREIGN PATENT DOCUMENTS 61-92069  5/1986  Japan .

Primary Examiner—Stafford D. Schreyer
Attorney, Agent, or Firm—Perman & Green

[57] ABSTRACT

A public telephone set includes a speech circuit including transmitting and receiving amplifiers for forming a channel loop and two pairs of conductors for respectively connecting a transmitter and a receiver in a handset to the transmitting and receiving amplifiers in the speech circuit. The telephone set further includes an energization circuit having a resistor applied with a power source voltage, a latching relay for switching at least one of the transmitter and the receiver through the conductors to the speech circuit or the energization circuit, and a CPU including an internal timer for monitoring a connecting state of the handset by presence/absence of a current supplied to the energization circuit or a voltage appearing in the energization circuit when the latching relay switches at least one of the transmitter and the receiver to the energization circuit.

8 Claims, 3 Drawing Sheets

PUBLIC TELEPHONE SET

BACKGROUND OF THE INVENTION

The present invention relates to a public telephone set.

Since public telephone sets are installed and available in shops and on streets and can be used by all people, these telephone sets are often vandalized. In particular, a handset incorporating transmitting and receiving lines is connected to a telephone set housing through a cord of transmitting and receiving lines. An operation failure occurs due to a disconnection of the cord. In this case, no means for detecting such a disconnection is provided in a maintenance center. Therefore, although the handset is disconnected from the telephone set housing, the telephone set is left out of order until a third party calls the maintenance center or a periodic inspection of the public telephone set is performed. In a recent public telephone system, a self-diagnosis function is provided to determine whether a telephone circuit is normally operated, and a diagnostic result is acknowledged to a remote area, e.g., a maintenance center. However, no consideration is taken for a handset disconnection in this system. A typical example of the system is European Pat. No. 12,102 wherein a self diagnosis is performed when an off-hook signal is generated.

SUMMARY OF THE INVENTION

It is, therefore, a principal object of the present invention to provide a public telephone set having a vandalism monitoring function of a handset.

In order to achieve the above object of the present invention, there is provided a public telephone set comprising a speech circuit including transmitting and receiving amplifiers for forming a channel loop and two pairs of conductors for respectively connecting a transmitter and a receiver in a handset to the transmitting and receiving amplifiers in the speech circuit, comprising an energization circuit applied with a power source voltage, switching means for switching at least one of the transmitter and the receiver through the conductors to the speech circuit or the energization circuit, control means for controlling the switching means, and monitoring means for monitoring a connecting state of the handset by presence/absence of a current supplied to the energization circuit or a voltage appearing in the energization circuit when the switching means switches at least one of the transmitter and the receiver to the energization circuit.

DESCRIPTION OF THE PREFERRED EMBODIMENT

The present invention will be described in detail with reference to the accompanying drawings.

Figure 1:
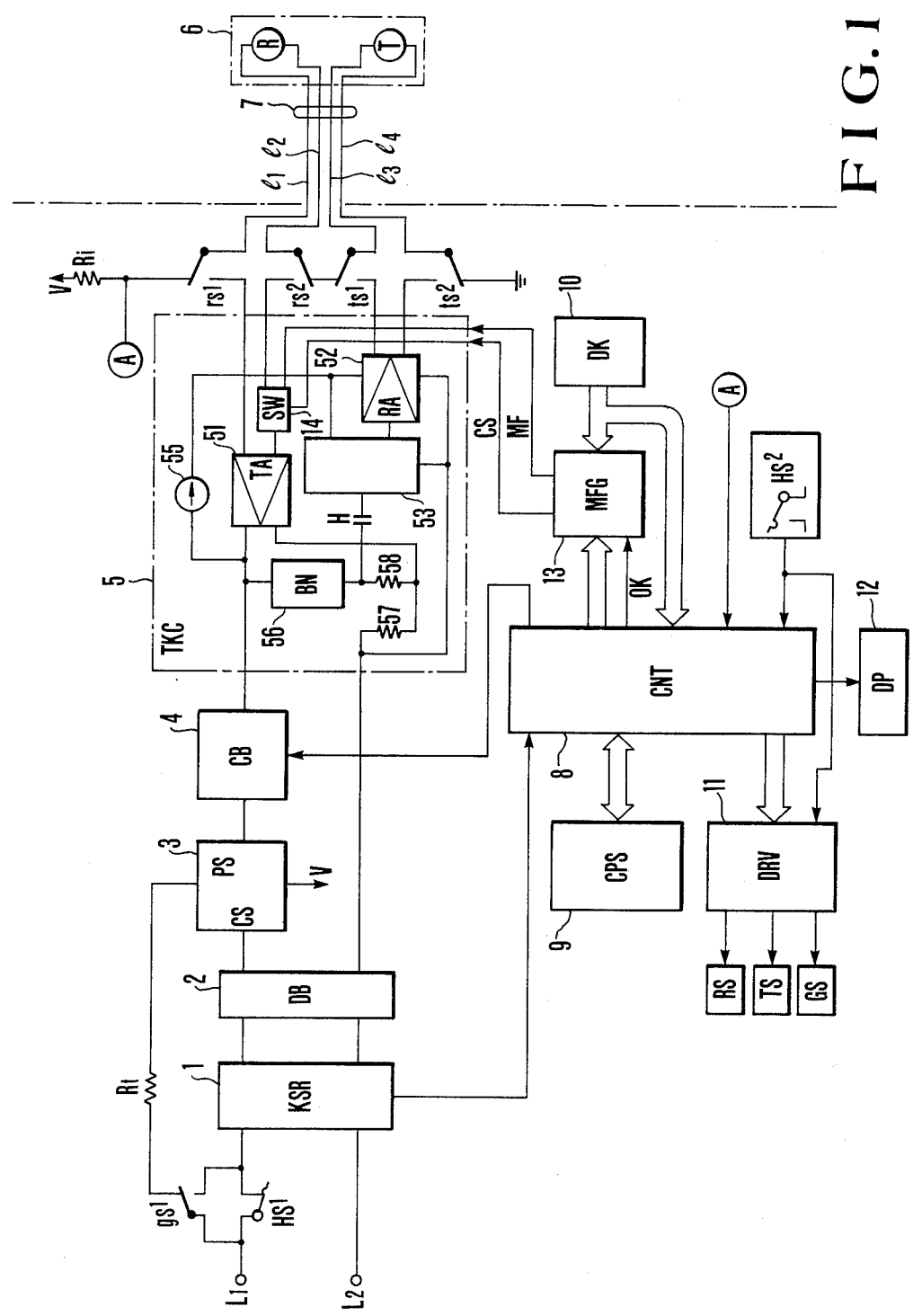
FIG. 1 is a block diagram of a public telephone set according to an embodiment of the present invention.

Referring to FIG. 1, a channel loop for line terminals L1 and L2 connected to telephone lines from an exchange is formed through a parallel circuit of a hook switch $HS^1$ and a contact $gs^1$ of a relay GS, a charging signal receiver (to be referred to as a KSR hereinafter) 1, a diode bridge (to be referred to as a DB hereinafter) 2, a power source (to be referred to as a PS hereinafter) 3, and a forced release circuit (to be referred to as a CB hereinafter) 4. A speech circuit (to be referred to as a TKC hereinafter) 5 including a transmitting amplifier (TA) 51 and a receiving amplifier (RA) 52 is connected to the line terminals L1 and L2. A transmitter T and a receiver R in the handset 6 are connected to the TKC 5 through a curled cord 7 consisting of two pairs of conductors 11 to 14 corresponding to the transmitter T and the receiver R. Contacts $rs^1$, $rs^2$, $ts^1$, $ts^2$ of relays RS and TS are inserted as a switching means between the TKC 5 and the handset 6. The switching means selectively switches the transmitter T and the receiver R to the TKC 5 side or the talking circuit side having a resistor Ri applied with a power source voltage V.

The TKC 5 includes a preamplifier 53, a constant current circuit 55, a balancing network (BN) 56, resistors 57 and 58, and a capacitor 59 in addition to the transmitting and receiving amplifiers 51 and 52. If an impedance is given as ZL when viewed from the line terminals L1 and L2 to the exchange, the resistors 57 and 58 and the balancing network 56 constitute a bridge circuit, thereby balancing the trunk, transmitter, and receiver signals. The output side of the transmitting amplifier 51 is connected in parallel with a serial circuit of the balancing network 56 and the resistor 58. The input side (one input terminal is connected through the capacitor 59) of the preamplifier 53 is connected between one trunk line terminal L2 (i.e., the line connected to one end of the resistor 57 and the DB 2) and a connecting point between the balancing network 56 and the resistor 58. The input side of the receiving amplifier 52 is connected to the output side of the preamplifier 53. The output side of the preamplifier 53 and the input side of the receiving amplifier 52 are connected as described above, and an output signal of a high level from the transmitting amplifier 51 is not input to the input side of the preamplifier 53.

One terminal of the input side of the transmitting amplifier 51 is connected to one end of the receiver R in the handset 6 through the contact $rs^1$ of the latching relay RS. The other terminal of the input side of the transmitting amplifier 51 is connected to the other end of the receiver R in the handset 6 through a switch (SW) 14 and the contact $rs^2$. One terminal of the output side of the receiving amplifier 52 is connected to one end of the transmitter T through the contact $ts^1$ of the latching relay TS. The other terminal of the output side of the receiving amplifier 52 is connected to the other end of the transmitter T through the contact $ts^2$ of the latching relay TS. The switch 14 receives an MF signal and a control signal CS from an MF signal generator (MFG) 13 (to be described later) in addition to signals from the transmitter T. The switch 14 selectively supplies the MF signal or the output from the transmitter T to the transmitting amplifier 51 in response to the control signal CS.

A controller (to be referred to as a CNT hereinafter) 8 including a processor (to be referred to as a CPU hereinafter) such as a microprocessor and a memory is arranged in the telephone set. The CNT 8 performs arithmetic control operations in response to outputs from a coin processor (to be referred to as a CPS hereinafter) 9, a dial key (to be referred to as a DK hereinafter) 10, a hook switch $HS^2$, and the KSR 1 and controls the relays GS, RS, and TS, a display (to be referred to as a DP hereinafter) 12, the MF signal generator (to be referred to as an MFG hereinafter) 13 for generating the multi-frequency code (to be referred to as an MF hereinafter) signal, and the CB 4.

The MFG 13 generates the MF signal designated by an operation of the DK 10 in response to the output from the DK 10 and control of the CNT 8 only when a permission signal OK is supplied from the CNT 8 thereto. The MFG 13 supplies the control signal CS to the TKC 5. The MF signal is output as a dial signal through the TKC 5. When monitoring information is sent to a maintenance center or the like, the MFG 13 is operated under the control of the CNT 8. After dialing is performed for a specific destination such as the maintenance center, as described above, the monitoring information is sent by the MF signal through the telephone lines.

The CNT 8 has a self-diagnosis function and performs a self diagnosis of a predetermined inspection part upon formation of a DC loop by the off-hook operation. At the same time, the CNT 8 sends the monitoring information on the basis of the self-diagnosis result. More specifically, a potential at the resistor Ri on the handset 6 side is fetched to detect the presence or absence of a current supplied to the conductors 11 to 14, thereby monitoring the connecting state of the handset 6.

In the released state of the latching relays RS and TS, the receiver R and the transmitter T are inserted between the resistor Ri and the common circuit through the conductors 11 to 14. A current is supplied from the power source to these serial circuits. At the same time, the potential at the resistor Ri on the contact $rs^1$ side is substantially the same as that at the common circuit since the receiver R and the transmitter T have a low resistance. Therefore, the CNT 8 determines that the handset 6 is normally connected. However, if the conductors 11 to 14 are disconnected, the potential at the resistor Ri on the contact $rs^1$ side is set to be substantially equal to the power source voltage V, thereby immediately detecting vandalism of the handset 6.

When a DC loop is formed through the TKC 5 upon operation of the hook switch $HS^1$ in response to an off-hook signal and a loop current having a predetermined polarity controlled by the DB 2 is generated, the PS 3 charges an internal capacitor CS and supplies the voltage of the capacitor CS as the power source voltage V. Even during the on-hook operation, a small current is supplied to the capacitor CS to charge it and operation of the CNT 8 can be immediately started. For this purpose, trickle charging of the capacitor CS in the PS 3 is performed by a resistor Rt having a high resistance through a contact $gs^1$ of a latching relay GS. The relay GS is energized through a driver (to be referred to as a DRV hereinafter) 11 in response to the output from the hook switch $HS^2$ operated in response to the off-hook signal, thereby stopping trickle charging.

When the user picks up the handset and inserts a coin in a coin slot, the DC loop is formed. At the same time, the CNT 8 generates the permission signal OK in response to the output from the CPS 9. Dialing by the DK 10 can be arbitrarily performed. At the same time, the CNT 8 energizes the relays RS and TS. The receiver R and the transmitter T in the handset 6 are respectively connected to the output of the receiving amplifier 52 in the TKC 5 and the input of the transmitting amplifier 51 therein. When a called party answers the phone, the calling and called parties can talk to each other.

When talking between the calling and called parties is initiated and continues, a charging signal such as a pulse having a frequency outside the bandwidth or a pulse having an inverted polarity reaches the telephone set, the charging signal is received by the KSR 1. In response to the output from the KSR 1, the CNT 8 controls the CPS 9 to store a coin. If a shortage of coins occurs, the CNT 8 controls the CB 4 to release the DC loop for a predetermined period of time. The exchange is released from the telephone set and the telephone set is forcibly disconnected from the telephone lines.

A coin insertion/accumulation state is continuously displayed on the DP 12. If an operation failure detected by the self diagnosis occurs, such a failure is also displayed on the DP 12.

Figure 2:
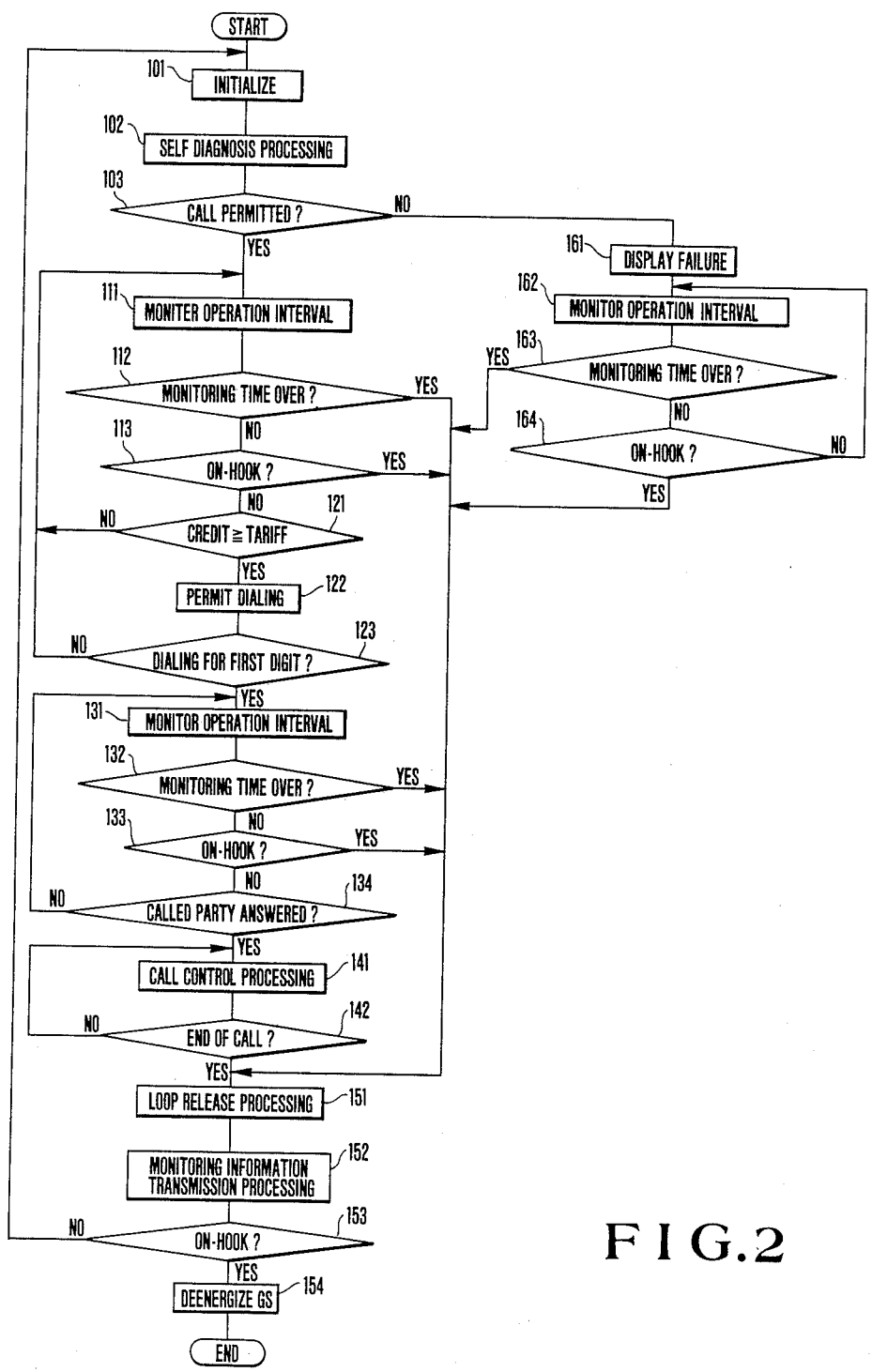
FIGS. 2 and 3 are flow charts for mainly explaining a self diagnosis of the telephone set shown in FIG. 1.

FIG. 2 is a flow chart mainly showing the self diagnosis processing of the CPU in the CNT 8. A DC loop is formed by operation of the off-hook switch $HS^1$ in response to the off-hook signal and operation of the contact $gs^1$. The CNT 8 is powered to "start" the self diagnosis routine. In step 101 for "initialization", the CPU resets the relays RS and TS, i.e., the contacts rs and ts are set in the illustrated positions in FIG. 1. "Self diagnosis processing" in step 102 is executed. The CPU determines in step 103 whether a "call is permitted". If YES in step 103, the CPU causes an internal timer as a time monitoring means to perform "operation interval monitoring" for a predetermined period of time, e.g., 25 sec in step 111. In other words, the CPU monitors whether a coin is inserted and one-digit dialing is performed within this period of time. If NO in step 112 for determining whether a "monitoring time is over?", the CPU checks in step 113 whether an "on-hook" state is detected in response to an output from the hook switch $HS^2$. If NO in step 113, the CPU determines in step 121 whether an amount of coins inserted in the telephone set is equal to or greater than a minimum charging amount, i.e., "credit $\geq$ tariff" is determined. If YES in step 121, the CPU performs "dialing permission" in step 122 so as to generate a permission signal OK. The CPU determines in step 123 whether "dialing for the first digit" is performed. If NO in step 123, the operations in step 111 and the subsequent steps are repeated.

If YES in step 123, the CPU causes the internal timer to perform "operation interval monitoring" in step 131 for, e.g., 100 sec. in the same manner as in step 111. If NO in step 132 for determining whether the "monitoring time is over", the CPU checks in step 133 whether an "off-hook" state is detected in the same manner as in step 113. If NO in step 133, the CPU determines in step 134 in response to an output from the KSR 1 whether a "called party answers the phone", the state of which is detected in response to the first charging signal. If NO in step 134, the operations in step 131 and the subsequent steps are repeated.

The operation in step 131 is performed to monitor the operation time interval from dialing for the second and subsequent digits upon dialing of the first digit to answering by the called party. The time interval is as long as 100 sec. so as to prevent step 132 from being determined to be YES and therefore prevent a forced release (to be described later).

The connecting state of the handset 6 is performed in monitoring in step 102. In the final stage of step 102, after the receiver R and the transmitter T in the handset 6 are connected to the TKC 5, monitoring by using the energization current cannot be performed. In order to detect vandalism of the handset 6 upon the connection of the receiver R and the transmitter T, the following fact is taken into consideration. That is, predetermined operations are continuously performed for predetermined time intervals in a given sequence. If these operations are not performed in the given sequence, the off-hook state is determined as a state caused by vandalism of the handset 6.

More specifically, if YES in step 134, "call control processing" is executed in step 141 to store the coins. If YES in step 142 for determining an "end of call" caused by the off-hook operation or a shortage of the remaining coins, the CPU controls the CB 4 in accordance with "loop release processing" in step 151. A switching element such as a transistor arranged in the CB 4 is turned off to release the DC loop for a predetermined period of time, e.g., 800 msec, thereby releasing the exchange. The CPU sends necessary information to the maintenance center or the like on the basis of the result in step 102 in accordance with "monitoring information transmission processing" of step 152. The CPU checks in step 153 if an "off-hook" state is detected in the same manner as in step 113. If YES in step 153, the CPU performs "GS deenergization" in step 154, thereby ending a series of operations. If YES in one of steps 112, 113, 132, and 133 before step 123 or 134 is set to be YES, the flow immediately advances to step 151. In step 152, information representing a connection failure of the handset 6 is sent as the monitoring information.

If NO in step 103, "failure display" in step 161 is performed on the DP 12. "Operation interval monitoring" in step 161 and "on-hook?" in step 164 are checked in the same manner as in steps 111 to 113. If YES in step 163 or 164, the flow immediately advances to step 151.

If the handset 6 is stolen by vandalism, step 153 becomes NO and the operations in step 101 and the subsequent steps are repeated. A connection failure of the handset 6 which has not been detected in the first step 102 can be finally detected in step 102 upon a release of the DC loop by operation interval monitoring. The monitoring information is then sent in step 152.

It should be noted that identical monitoring information is not sent twice. Even if steps 101 to 153 are repeated, the connection failure of the handset 6 is transmitted to the maintenance center or the like once.

Figure 3:
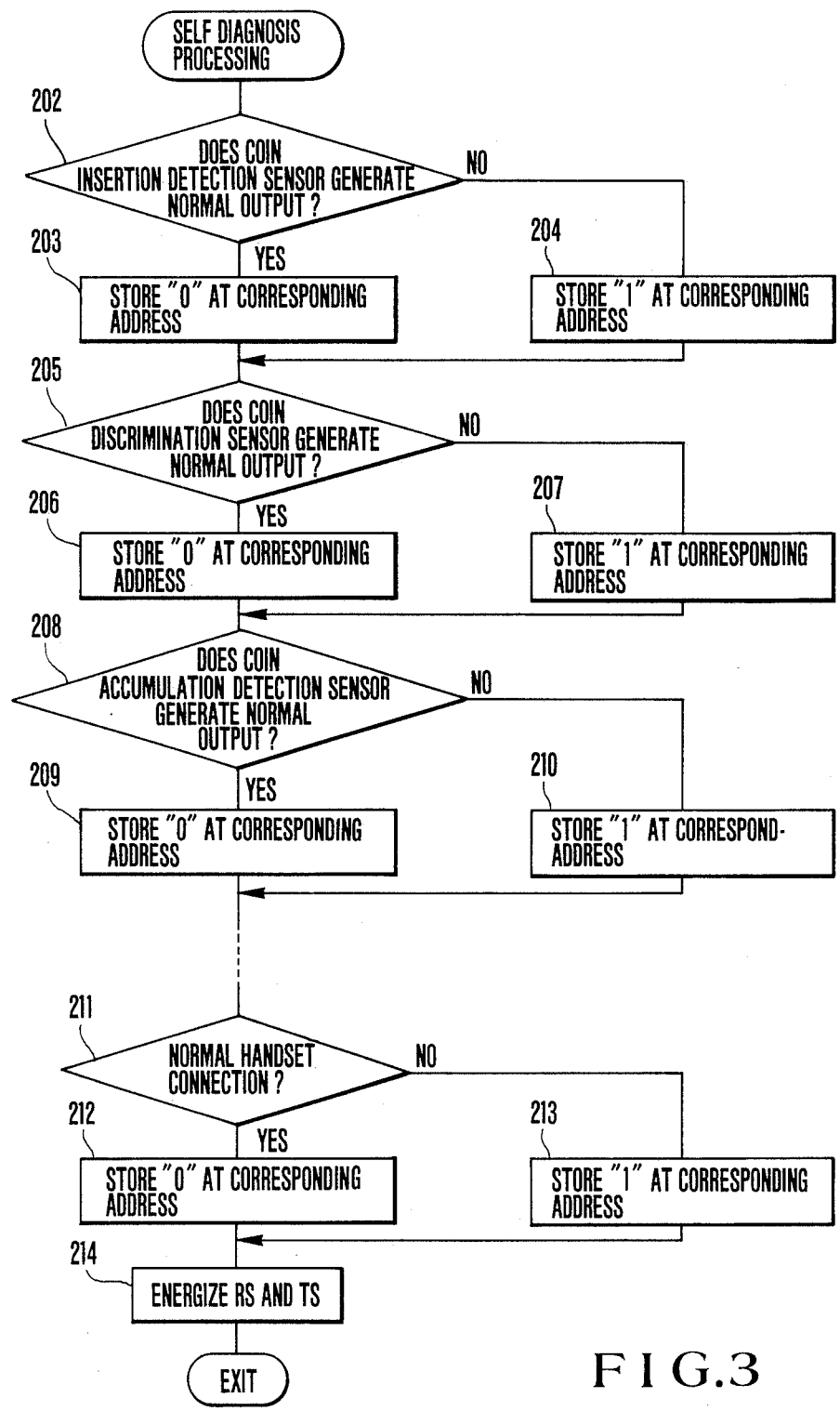

FIG. 3 is a subroutine showing the detailed operations in step 102. The CPU determines in step 202 in response to the output from the CPS 9 whether a "coin insertion detection sensor generates a normal output". If YES in step 202, data of "0" is stored at the corresponding address of the memory for storing the diagnosis result in step 203. If NO in step 202, data of "1" is stored (step 204) at the corresponding address in the same manner as in step 203. The CPU then determines in step 205 whether a "coin discrimination sensor generates a normal output" and in step 208 whether a "coin accumulation detection sensor generates a normal output". The operations in steps 206, 207, 209, and 210 are subsequently performed and the operation results are stored in the memory. In addition, identical processing is performed for other components of the telephone set. The CPU determines in step 211 whether the "handset is normally connected". If YES in step 211, data of "0" is stored (step 212) at the corresponding address of the memory in the same manner as in step 203. If NO in step 211, data of "1" is stored (step 213) at the corresponding address of the memory. The relays RS and TS are then energized in step 214.

If data of "1" is stored in the memory, a connection failure occurs. The corresponding monitoring information is transmitted in step 152 in response to the data of "1" in the memory.

As is apparent from the above description, two pairs of standard cords 7 are used to properly monitor vandalism of the handset 6 with an inexpensive arrangement. A semi-permanent failure caused by the absence of the handset 6 can be immediately detected.

A pseudo loop system may be employed wherein the control states of the relays RS and TS are changed and operated upon insertion of a coin, thereby allowing a telephone operator to communicate with a caller. The above scheme of the present invention may also serve for mute control of the transmitter. The relays RS and TS may be replaced with a single relay to obtain the same effect as described above.

A relay contact may be inserted in at least one of the transmitter T and the receiver R. The arrangement of the speech circuit may be arbitrarily changed.

In steps 111 to 123 and 131 to 134, the operation time intervals from the off-hook state to answering by the called party are intermittently controlled. However, the separate time intervals may be replaced with a continuous time interval. In addition, one of the time intervals in step 111 to 123 and 131 to 134 may be employed.

If the off-hook state is detected upon transmission of the monitoring information in step 152, the DC loop may be semi-permanently released by another latching relay or the like. The formation and release of the DC loop which are caused by the disconnection of the handset in the repeated operations in step 101 and the subsequent steps may be prevented. The flow need not advance to step 151 if decisions in steps 112, 132, and 163 are YES. After the relays RS and TS may be instantaneously released and their energization states may be checked, the flow advances to step 151 upon deenergization of the relays RS and TS. Other various modifications and changes may be made within the spirit and scope of the invention.

In the above embodiment, the connecting state of the handset is detected by the presence/absence of a current supplied to the energization circuit. However, the connecting state may be detected by the presence/absence of a voltage appearing in the energization circuit.

As is apparent from the present invention, the two pairs of standard cords are used for a handset connection, and vandalism of the handset is perfectly monitored. The present invention provides a good advantage in public telephone sets installed in any area of some countries.

What is claimed is:

1. A public telephone set comprising a speech circuit including transmitting and receiving amplifiers for forming a channel loop and two pairs of conductors for respectively connecting a transmitter and a receiver in a handset to said transmitting and receiving amplifiers in said speech circuit, comprising:

an energization circuit applied with a power source voltage;

switching means for switching at least one of said transmitter and said receiver through said conductors to said speech circuit or said energization circuit;

monitoring means for monitoring a connecting state of said handset by presence/absence of a current supplied to said energization circuit or a voltage appearing in said energization circuit when said switching means switches at least one of said transmitter and said receiver to said energization circuit; and control means for controlling said switching means and for performing a predetermined self diagnosis of a test portion including said monitoring means in the off hook operation.

2. A set according to claim 1, wherein said switching means comprises a relay having contacts respectively inserted between said transmitting amplifier and said transmitter and between said receiving amplifier and said receiver, said contacts being operated to connect between said transmitting amplifier and said transmitter and between said receiving amplifier and said receiver during a call and to constitute a series circuit including said energization circuit, said transmitter, and said receiver between said power source voltage and a reference potential during monitoring.

3. A set according to claim 1, wherein said relay comprises a latching relay.

4. A set according to claim 1, further comprising time interval monitoring means for monitoring an operation time interval from an off-hook operation to answering by a called party, and loop control means for releasing said DC loop for a predetermined period of time in response to an output from said time interval monitoring means.

5. A set according to claim 4, wherein said time interval monitoring means comprises a first timer means for monitoring a nonoperation from the off-hook operation to first dialing and a second timer means for monitoring a nonoperation from the first dialing to a response by a called party.

6. A set according to claim 4, wherein said time interval monitoring means comprises a third timer means for monitoring a nonoperation and means for driving said loop control means in response to outputs from said third timer means so as to inhibit a call when a result of the self diagnosis represents a failure.

7. A set according to claim 1, wherein said switching means comprises means for constituting a series circuit of said receiver and said transmitter and connecting said series circuit to said energization circuit.

8. A public telephone set for performing a self diagnosis for a predetermined inspection part in response to formation of a DC loop and for performing automatic dialing to a specific destination on the basis of a result of the self diagnosis and transmitting monitoring information to said specific destination, comprising time interval monitoring means for monitoring an operation time interval from an off-hook operation to answering by a called party, loop control means for releasing said DC loop for a predetermined period of time in response to an output from said time interval monitoring means and control means for initiating the self diagnosis under an assumption of the off-hook state after the DC loop is released by said loop control means.

* * * * *